H. A. KNIGHT.
Boxes for Transporting Eggs, &c.
No. 147,332.  Patented Feb. 10, 1874.
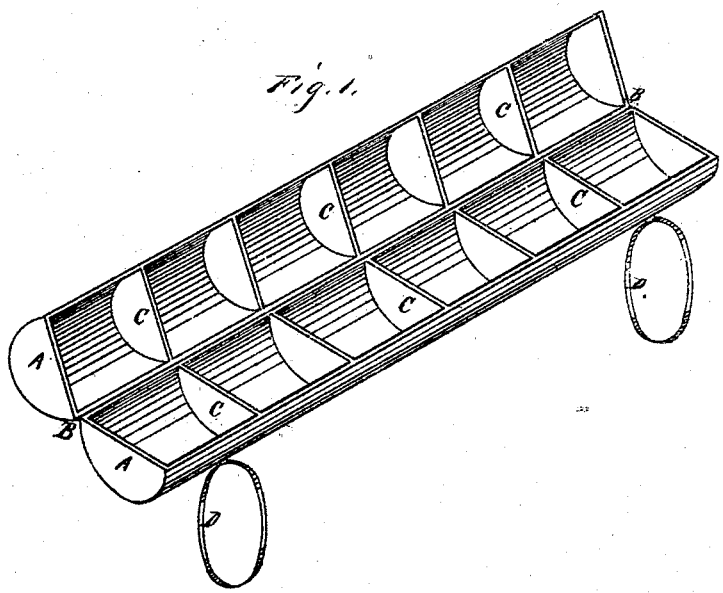
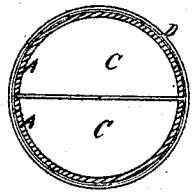
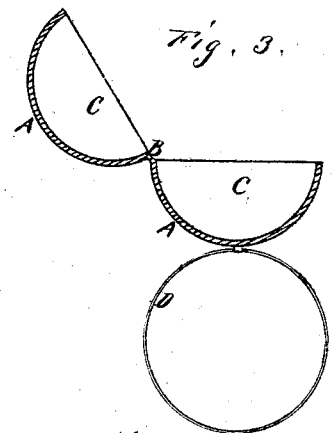
Witnesses
Geo. H. Strong.
C. M. Richardson
Hiram Abiff Knight
By his Attys
Dewey & Co.

UNITED STATES PATENT OFFICE.

HIRAM A. KNIGHT, OF SAN BRUNO, CALIFORNIA.

IMPROVEMENT IN BOXES FOR TRANSPORTING EGGS, &c.

Specification forming part of Letters Patent No. 147,332, dated February 10, 1874; application filed November 3, 1873.

*To all whom it may concern:*

Be it known that I, HIRAM A. KNIGHT, of San Bruno, San Mateo county, State of California, have invented a Device for Transporting Eggs and Fruit; and I do hereby declare the following description and accompanying drawings are sufficient to enable any person skilled in the art or science to which it most nearly appertains to make and use my said invention without further invention or experiment.

My invention relates to a novel device for the transportation of eggs or some kinds of fruit; and it consists, principally, in the employment of a long cylindrical or other suitably-shaped box, so hinged as to open longitudinally. Within this box are partitions, placed transversely, so that one egg will be contained in each of the spaces so formed. The cylinders may be closed and packed in larger boxes of suitable size, for transportation.

Referring to the accompanying drawing for a more complete explanation of my invention, Figure 1 is a perspective view of my carrier. Fig. 2 is an end view, closed. Fig. 3 is an end view, opened.

A A are two halves of a cylindrical or other suitably shaped box. These halves are hinged together at B, and may be made of pasteboard or other light material, and of suitable length to contain six, twelve, or other number of eggs in a line. The diameter of the cylinder when closed is just sufficient to contain one egg. In order to separate the eggs, so that each will occupy one compartment, and be protected from breakage, I employ semicircular partitions of pasteboard, C, which are placed in each half of the cylinder and stand opposite to each other, so that the partition will be complete when the box is closed. At the ends of the cylinder are elastic loops D, so secured that they may be readily passed over both halves of the cylinder when closed, and thus secure its contents.

In order to transport these small cases from place to place, they are laid in a larger box or case of wood, and shipped in the ordinary manner. The form of these carriers A is such that they offer the greatest resistance to any crushing force, and a complete protection to their contents, while being, at the same time, so separated from other cases that any accident to or spoiling of a case would not injure the remainder.

As these cases can be afforded at a low price, they can be sold with the eggs to the consumer, and thus afford a safe and easy method of delivering any number of eggs.

When intended for fruit or other substances which need ventilation, perforations may be made in the compartment for that purpose.

Having thus described my invention, what I claim, and desire to secure by Letters Patent, is—

The elongated cylindrical case, composed of the two sections A A, hinged at B, and provided with the partitions C, constructed substantially as and for the purpose described.

In witness whereof I hereunto set my hand and seal.

HIRAM ABIFF KNIGHT. [L. S.]

Witnesses:
GEO. H. STRONG,
C. MILTON RICHARDSON.